United States Patent Office 3,767,796
Patented Oct. 23, 1973

3,767,796
IMIDAZOLIDINONE DERIVATIVES IN CONTROLLING PSYCHOSOMATIC DISTURBANCES
Walter Schindler, Riehen, Basel-Stadt, and Erich Schmid, Basel, Switzerland, assignors to Ciba-Geigy Corporation, Ardsley, N.Y.
No Drawing. Original application Mar. 26, 1970, Ser. No. 24,392, now Patent No. 3,646,037, dated Feb. 29, 1972. Divided and this application Sept. 20, 1971, Ser. No. 182,214
Claims priority, application Switzerland, Mar. 28, 1969, 4,799/69; May 21, 1969, 7,693/69
Int. Cl. A61k 27/00
U.S. Cl. 424—250          9 Claims

ABSTRACT OF THE DISCLOSURE

1-[4 [3-[dibenz[b,f]azepin - 5 - yl]-2-methyl-propyl]-1-piperazinyl-alkyl]-3-alkyl-2-imidazolidinone derivatives and the pharmaceutically acceptable acid addition salts thereof are useful for the treatment of psychosomatic disturbances; an illustrative embodiment is 1-[2-[4-[3-(5H-dibenz[b,f]azepin-5-yl) - 2-methyl-propyl]-1-piperazinyl]-ethyl]-3-methyl-2-imidazolidinone.

CROSS-REFERENCE TO RELATED APPLICATION

This is a division of application Ser. No. 24,392, filed Mar. 26, 1970, now U.S. Pat. No. 3,646,037.

DETAILED DISCLOSURE

The present invention relates to new imidazolidinone derivatives, to processes for the production thereof, to pharmaceutical compositions containing the new compounds and to their use.

More particularly, the present invention relates to compounds of the general Formula I,

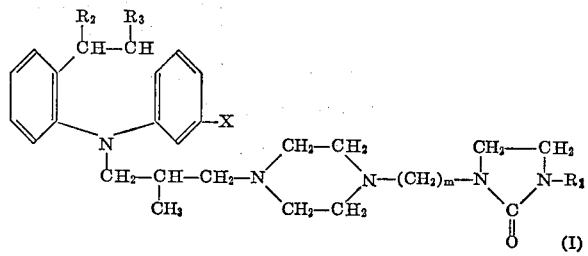

wherein
X is hydrogen or chlorine,
m is 2 or 3,
$R_1$ is methyl or ethyl, and
each of $R_2$ and $R_3$ is hydrogen or, together, they form an additional bond, and pharmaceutically acceptable acid addition salts thereof.

It has now been found that such compounds possess valuable pharmacological properties in warm blooded animals which are combined with a favourable high therapeutic index. In particular upon oral, rectal or parenteral administration they potentiate anesthesia, inhibit the orientation motility in mice and conditioned behaviour in rats. They have anti-emetic and serotonin-antagonistic actions, exert a positive effect in the "test de la traction" and have also sympathicolytic actions. They, furthermore, exhibit low parasympathicolytic and cataleptic effects.

The pharmacological properties of the compounds of the invention are determined by selected standard tests [cp. R. Domenjoz and W. Theobald, Arch. Int. Pharmacodyn. 120, 450 (1959) and W. Theobald et al., Arzneimittel-Forsch. 17, 561 (1967)]. For example, upon intraperitoneal administration of about 1.8 mg./kg. of 1-[2- [4-[4-(5H-dibenz[b,f]azepin-5-yl) - 2 - methyl-propyl]-1-piperazinyl]-ethyl]-3-methyl-2-imidazolidinone dihydrochloride or of 3.3 mg./kg. of 1-[2-[4-[3-(10,11-dihydro-5H-dibenz[b,f]azepin - 5 - yl) - 2 - methyl - propyl] - 1 - piperazinyl]-ethyl]-3-methyl - 2 - imidazolidinone dihydrochloride to mice, the spontaneous orientation motility is decreased to a considerable extent. The same compounds administered in amounts of about 12 mg./kg. subcutaneously to mice, prevent a considerable percentage of the animals, hanging on to a wire with their front paws, from pulling up and gripping the wire with their hind paws (test de la traction). The anti-emetic actions are determined in gold-hamsters and dogs, and appear at dosages as low as about 0.82 mg./kg. and 0.05 mg./kg. respectively, upon subcutaneous administration. The anesthesia potentiating activity of the compounds of the invention are demonstrated by subcutaneous administration of about 2 to 50 mg./kg. to mice, anesthetized by intraperitoneal injection of 40 mg./kg. of the short-acting anesthetic N,N-dimethyl - 2 - methoxy-4-allyl-phenoxy acetic acid amide.

The toxicity of the compounds of the invention is of favourably low order as demonstrated in mice.

The pharmacological properties of the compounds of the invention as shown in above tests, render them suitable for the treatment of psychosomatic disturbances.

The new compounds are superior over the known 4-[3 - (dibenz[b,f]azepin-5-yl)-propyl]-piperazin-1-ethanol (Opipramol) in their motility-inhibiting and anti-emetic action, as well as in the "test de la traction."

A compound of the general Formula I is produced, according to the invention, by reacting a reactive ester of a compound of the general Formula II,

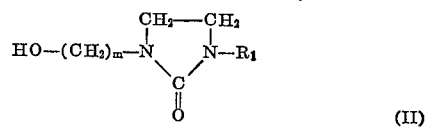

wherein m and $R_1$ have the meaning given under Formula I, with a compound of the general Formula III,

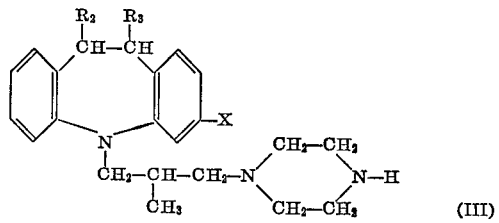

wherein X, $R_2$ and $R_3$ have the meanings given under Formula I or with an alkali metal derivative of such a compound and, optionally, converting the reaction product with an inorganic or organic acid into an addition salt.

Suitable reactive esters of the compounds of the general Formula II are, e.g. halides such as chlorides or bromides, also sulphonic acid esters, e.g. the methanesulphonic acid ester or the o- or p-toluenesulphonic acid ester. When a chloride or bromide is used as reactive ester, then it is advantageous to add to the reaction mixture a catalytic amount of an iodide such as, e.g. sodium iodide.

The stated reactive esters are reacted with a free base of the general Formula III, preferably in the presence of a solvent. Suitable solvents are those which are inert under the reaction conditions, e.g. hydrocarbons such as benzene or toluene, halogenated hydrocarbons such as chloroform, ethereal liquids such as ether or dioxane, lower alkanones such as methyl ethyl or diethyl ketone, as well as phosphoric acid amides, e.g. hexamethylphosphoric acid triamide.

In the reaction, according to the invention, of one molecular equivalent of a reactive ester with one molecular equivalent of free base, one molecular equivalent of acid is split off. This acid can be bound to the excess base of the general Formula III, or also it can be bound to the dibasic reaction product. Preferably, however, an acid-binding agent is added to the reaction mixture. Suitable acid-binding agents are, e.g. alkali metal carbonates such as sodium or potassium carbonate, also tertiary organic bases such as, e.g. pyridine, triethylamine or especially N,N-diisopropyl-ethylamine. Excess tertiary bases can also be used as solvent.

If, instead of the free base of the general Formula III, an alkali metal derivative of this compound is used in the reaction according to the invention, e.g. a sodium, potassium or lithium derivative, then it is advantageous to perform the reaction in a hydrocarbon, e.g. in benzene or toluene.

Of the starting materials falling under the reactive esters of hydroxy compounds of the general Formula II, the 1 - (2 - chloroethyl)- and the 1 - (3-chloropropyl)-3-methyl-2-imidazolidinone are known. Further compounds of this type can be produced analogously. The 5-[2-methyl - 3 - (1-piperazinyl)-propyl] - 10,11 - dihydro-5H-dibenz[b,f]azepine, which falls under the starting materials of the general Formula III, is described in the literature. It can be produced by a new process, e.g. as follows: Starting with the known 5-[2-methyl-3-(4-methyl-1-piperazinyl)-propyl] - 10,11 - dihydro-5H-dibenz[b,f]azepine, this is reacted with cyanogen bromide to the crude 4-[3-(10,11 - dihydro - 5H - dibenz[b,f]azepine - 5 - yl)-2-methyl-propyl]-piperazine-1-carbonitrile, which is hydrolysed with dilute hydrochloric acid and simultaneously decarboxylated.

A second compound falling under the starting materials of the general Formula III, the 5-[2-methyl-3-(1-piperazinyl)-propyl]-5H-dibenz[b,f]azepine, can be produced, e.g. starting with 5-(3-chloro-2-methyl-propyl)-5H-dibenz[b,f]azepine (cp. J. R. Geigy A.G., Swiss Pat. No. 374,681), as follows: The stated chloride is reacted, in the presence of potassium carbonate and sodium iodide, with 1-piperazinecarboxylic acid ethyl ester to give the 4-[3-(5H-dibenz[b,f]azepine - 5 - yl) - 2 - methyl-propyl]-piperazine-1-carboxylic acid ethyl ester, which is hydrolysed with potassium hydroxide and simultaneously decarboxylated.

Using a second process according to the invention, a compound of the general Formula I is produced by reacting a compound of the general Formula IV,

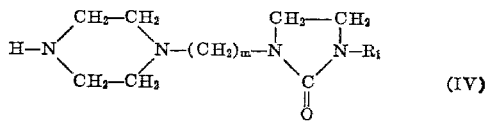

wherein $m$ and $R_1$ have the meaning given under Formula I, or an alkali metal compound of such a compound, with a reactive ester of a compound of the general Formula V,

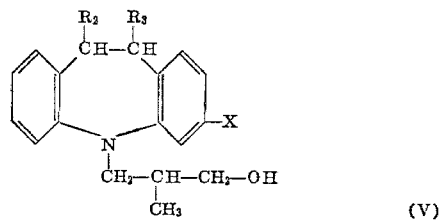

wherein X, $R_2$ and $R_3$ have the meaning given under Formula I, and optionally converting the reaction product with an inorganic or organic acid into an addition salt.

Suitable alkali metal derivatives of compounds of the general Formula IV are, e.g. sodium, potassium or lithium derivatives. Suitable reactive esters of compounds of the general Formula V are, e.g. halides such as chlorides or bromides, also sulphonic acid esters such as the methanesulphonic acid ester or the o- or p-toluenesulphonic acid ester.

The reaction, according to the invention, of the free bases of the general Formula IV, or of their alkali metal derivatives, with the reactive esters of the compounds of the general Formula V can be performed in the same solvents as in the first process and, if chlorides or bromides are used as reactive esters, then also a catalytic amount of an iodide, e.g. sodium iodide, can be added to the reaction mixture.

If the free bases are used for the reaction, then also the same acid-binding agents can be used.

The starting materials of the general Formula IV are described in the literature. Likewise known are 5-(2-methyl-3-chloropropyl)-5H-dibenz[b,f]azepine and 5-(2-methyl-3-chloropropyl)-10,11-dihydro - 5H - dibenzo[b,f] azepine [cp. J. R. Geigy A.G., Swiss Pat. No. 374,681 or Belgian Pat. No. 594,436), which are examples for the second reaction component.

Using a third process according to the invention, compounds of the general Formula I are produced by reacting a reactive ester of a compound of the general Formula VI,

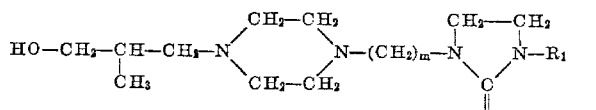

wherein $m$ and $R_1$ have the meaning given under Formula I, with a compound of the general Formula VII,

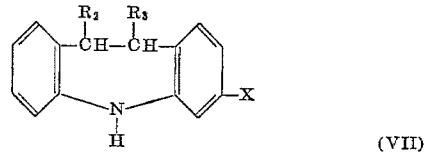

wherein X, $R_2$ and $R_3$ have the meanings given under Formula I, in the presence of a basic condensation agent and, optionally, converting the reaction product with an inorganic or organic acid into an addition salt.

Suitable condensation agents are, in particular, alkali metal amides, e.g. sodium or lithium amide, also alkali metals, e.g. sodium or lithium, alkali metal hydrides, e.g. sodium or lithium hydride, also an alkali-metal-organic compound, e.g. butyl or phenyl lithium. The reaction can be performed in the presence or the absence of an inert organic solvent. Suitable solvents are, e.g. hydrocarbons such as benzene, toluene or xylene.

A starting material of the general Formula VI is, e.g. the 1-[2-[4-(2 - methyl - 3 - chloropropyl) - 1 - piperazinyl]-ethyl] - 3 - methyl - 2 - imidazolidinone which, for example, can be produced as follows: Starting with β,4-dimethyl-piperazine - 1 - propanol, this is acylated with acetanhydride in pyridine to give the 1-(2-methyl-3-acetoxypropyl) - 4 - methylpiperazine; the acylation product yields with cyanogen bromide in benzene, crude 4 - (2 - methyl - 3 - acetoxypropyl) - 1 - piperazinecarbonitrile, which is hydrolized and simultaneously decarboxylated with hydrochloric acid to the β-methyl-piperazine - 1 - propanol. The piperazinepropanol derivative condenses with 1-(2 - chloroethyl)-3-methyl-2-imidazolidinone, in the presence of sodium iodide and potassium carbonate in diethyl ketone, to give the 1 - [2 - [4 - (2-methyl - 3 - hydroxypropyl) - 1 - piperazinyl]-ethyl]-3-methyl - 2 - imidazolidinone, which is converted with hydrogen chloride in chloroform into the dihydrochloride. Finally, the hydroxyl group of the dihydrochloride is replaced, with the aid of thionyl chloride, by chlorine and the dihydrochloride is converted with concentrated sodium hydroxide solution into the free base. Further starting materials of the general Formula VI can be produced analogously.

Using a fourth process according to the invention, a compound of the general Formula I wherein m represents 2, is produced by reacting a compound of the general Formula III, wherein X, $R_2$ and $R_3$ have the meanings given under Formula I or an alkali metal compound of such a compound with a compound of the general Formula VIII

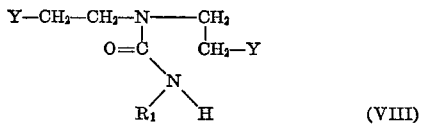

wherein
Y represents halogen and
$R_1$ has the meaning given under Formula I or an alkali metal derivative of such a compound, and optionally converting the reaction product with an inorganic or organic acid into an addition salt. The resiue Y represents preferably chlorine or bromine.

The reaction, according to the invention, of the free bases of the general Formula III or of their alkali metal derivatives with the urea derivatives of the general Formulta VIII is carried out preferably in the presence of a solvent. Suitable solvents are those which are inert under the reaction conditions, e.g. hydrocarbons such as benzene or toluene, halogenated hydrocarbons such as chloroform, ethereal liquids such as ether or dioxane, lower alkanones such as acetone, methyl-ethyl or diethyl-ketone. The reaction is performed at a temperature of between 50 and 150° C., preferably at the boiling point of the solvent used.

In the reaction, according to the invention, of one molecular equivalent of free base with one molecular equivalent of urea derivative, two molecular equivalents of halogen chloride are split off. This acid can be bound to the excess base of the general Formula III, or also it can be bound to the reaction product. Preferably, however, an acid binding agent is added to the reaction mixture. Suitable acid binding agents are, e.g. alkali metal carbonates such as sodium or potassium carbonate, also tertiary organic bases such as, e.g. pyridine, triethylamine or especially, N,N-diisopropyl-ethylamine. Excess tertiary bases can also be used as solvents.

If, instead of the free base of the general Formula III or of a compound of the general Formula VIII, an alkali metal derivative of the respective compounds is used in the reaction according to the invention, e.g. a sodium, potassium or lithium derivative, it is then advantageous to perform the reaction in a hydrocarbon, e.g. in benzene or toluene.

Alkali metal derivatives of compounds of the general Formula III or VIII are obtained preferably in situ by reacting one mol of the compound of the general Formula III or VIII with at least one molecular equivalent of an alkali metal hydride, e.g. sodium hydride or lithium hydride, or an alkali metal amide, e.g. sodium amide or lithium amide.

One of the starting materials of the general Formula VIII, the 1-methyl - 3,3 - bis-(2-chloroethyl)-urea is prepared by reacting diethanolamine with 1-methylisocyanate yielding 1-methyl - 3,3 - bis-(2-hydroxyethyl)-urea, followed by reaction with thionylchloride, whereby sulphur dioxide and hydrogen chloride are split off.

Further starting materials of the general Formula VIII are obtained by means of analogous reactions.

The compounds of the general Formula I, obtained using the processes according to the invention, are then optionally converted in the usual manner into their addition salts with inorganic an organic acids. For example, an organic solvent with the acid desired as salt component, or a solution thereof, is added to a solution of a compound of the general Formula I. For the reaction, organic solvents are preferably chosen, in which the formed salt is difficultly soluble, so that it can be separated by filtration. Such solvents are, e.g. methanol, acetone, methyl ethyl ketone, ethanol, acetone/ethanol, methanol/ether or ethanol/ether.

For use as medicaments, pharmaceutically acceptable acid addition salts can be use instead of free bases, i.e. salts with such acids, the anions of which are not toxic in the case of the dosages in question. Moreover, it is of advantage if the salts to be used as medicaments crystallise well and are not, or only slightly, hygroscopic. For salt formation with compounds of the general Formula I, it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, oxalic acid, succinic acid, fumaric acid, maleic acid, benzoic acid, salicylic acid, phenylacetic acid, mandelic acid and embonic acid.

As mentioned above, the new active substances are administered orally, rectally or parenterally. The dosage depends on the manner of administration, on the species, on the age and on the individual condition. The daily dosages of the free bases or of pharmaceutically acceptable salts thereof vary between 0.3 mg./kg. and 4.3 mg./kg. for warm-blooded animals. Suitable dosage units such as dragées, tablets, suppositories or ampoules, preferably contain 5–100 mg. of an active substance according to the invention.

Dosage units for oral administration preferably contain as active substance between 1 and 90% of a compound of the general Formula I or of a pharmaceutically acceptable salt thereof. They are produced by combining the active substance, e.g. with solid pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The dragée cores are coated, e.g. with concentrated sugar solutions which can also contain, e.g. gum arabic, talcum and/or titanium dioxide, or they are coated with a lacquer dissolved in readily volatile organic solvents or in mixtures of solvents. Dyestuffs can be added to these coatings, e.g. to distinguish between varying dosages of active substance.

Other suitable dosage units for oral administration are hard gelatine capsules as well as soft closed capsules made from gelatine and a softener such as glycerin. The hard gelatine capsules preferably contain the active substance as a granulate, e.g. in admixture with fillers such as maize starch, and/or with lubricants such as talcum or magnesium stearate, and optionally with stabilisers such as sodium metabisulphite ($Na_2S_2O_5$) or ascorbic acid. In soft capsules, the active substance is preferably dissolved or suspended in suitable liquids, such as liquid polyethylene glycols, whereby stabilisers can likewise be added.

Suitable dosage units for rectal administration are, e.g. suppositories consisting of a combination of an active substance with a suppository foundation substance. Suitable as such are, e.g. natural or synthetic triglycerides, paraffin hydrocarbons, polyethylene glycols or higher alkanols. Also suitable are gelatine rectal capsules consisting of a combination of the active substance and a foundation substance. Suitable as a foundation substance are, e.g. liquid triglycerides, polyethylene glycols or paraffin hydrocarbons.

Ampoules for parenteral, particularly intramuscular administration, preferably contain a water-soluble salt as active substance in a concentration of preferably 0.5–5%, optionally together with suitable stabilisers and buffer substances, in aqueous solution.

The following prescriptions further illustrate the production of tablets, dragées, capsules, suppositories and ampoules:

(a) 250 g. of 1-[2-[4-[3-(5H-dibenz[b,f]azepin-5-yl)-2 - methyl - propyl]-1-piperazinyl]-ethyl]-3-methyl-2-imidazolidinone dihydrochloride are mixed with 175.80 g. of lactose and 169.70 g. of potato starch. The mixture is moistened with an alcoholic solution of 10 g. of stearic acid and granulated through a sieve. After the granulate has been dried, 160 g. of potato starch, 200 g. of talcum, 2.50 g. of magnesium stearate and 32 g. of colloidal silicon dioxide are mixed in and the mixture is pressed into 10,000 tablets, each weighing 100 mg. and each containing 25 mg. of active substance. Optionally, the tablets can be provided with grooves for more precise adjustment of the dosage amount.

(b) A granulate is produced from 250 g. of 1-[2-[4-[3 - (10,11-dihydro-5H-dibenz[b,f]azepin-5-yl)-2-methylpropyl]-1-piperazinyl]-ethyl]-3-methyl - 2 - imidazolidinone dihydrochloride, 175.90 g. of lactose and the alcoholic solution of 10 g. of stearic acid. After the granulate has been dried, it is mixed with 56.60 g. of colloidal silicon dioxide, 165 g. of talcum, 20 g. of potato starch and 2.50 g. of magnesium stearate and the mixture pressed into 10,000 dragée cores. These are subsequently coated with a concentrated syrup made from 502.28 g. of crystallised saccharose, 6 g. of shellac, 10 g. of gum arabic, 0.22 g. of dyestuff and 1.5 g. of titanium dioxide, and then dried. The obtained dragées each weigh 120 mg. and each contain 25 mg. of active substance.

(c) To produce 1000 capsules, each containing 25 mg. of active substance, 25 g. of 1-[2-[4-[3-(5H-dibenz[b,f]azepin - 5 - yl)-2-methyl-propyl]-1-piperazinyl]-ethyl]-3-methyl-2-imidazolidinone dihydrochloride are mixed with 248.0 g. of lactose. The mixture is uniformly moistened with an aqueous solution of 2.0 g. of gelatine and granulated through a suitable sieve (e.g. Sieve III according to Ph. Helv. V). The granulate is mixed with 10.0 g. of dried maize starch and 15.0 g. of talcum and the mixture is evenly filled into 1000 hard gelatine capsules, size 1.

(d) A suppository mixture is prepared from 2.5 g. of 1-[2-[4-[3-(10,11-dihydro - 5H - dibenz[b,f]azepin-5-yl)-2-methyl-propyl]-1-piperazinyl]-ethyl]-3-methyl - 2 - imidazolidinone dihydrochloride and 167.5 g. of adeps solidus and the obtained mixture is filled into 100 suppositories, each containing 25 mg. of active substance.

(e) A solution of 25 g. of 1-[2-[4-[3-(5H-dibenz[b,f]azepin-5-yl) - 2 - methyl-propyl]-1-piperazinyl]-ethyl]-3-methyl-2-imidazolidinone dihydrochloride in one litre of water is filled into 100 ampoules and sterilised. An ampoule contains a 2.5% solution of 25 mg. of active substance.

The following examples further illustrate the production of the new compounds of the general Formula I and of intermediate products not described hitherto, but the examples in no way limit the scope of the invention. The temperatures are given in degrees centigrade.

Example 1

(a) 7.8 g. (0.048 mol) of 1-(2-chloroethyl)-3-methyl-2-imidazolidinone and 13.3 g. (0.040 mol) of 5-[2-methyl-3-(1-piperazinyl)-propyl]5H-dibenz[b,f]azepine are refluxed with 5.5 g. (0.040 mol) of potassium carbonate and 0.5 g. (0.003 mol) of sodium iodide in 100 ml. of diethyl ketone, whilst being stirred, for 20 hours. After cooling, the obtained precipitate is filtered under suction and subsequently washed with diethyl ketone. The filtrate is separated, under a water-jet vacuum, from the solvent and the residue taken up in ethyl acetate. The ethyl acetate solution is then washed with water and extracted by being repeatedly shaken with 2 N hydrochloric acid. The combined acid aqueous solutions are rendered alkaline with concentrated ammonia and the liberated base is extracted with ethyl acetate. The ethyl acetate solution is washed with water, dried over sodium sulphate and concentrated by evaporation under a water-jet vacuum. The residue, the crude base, is dissolved in 80 ml. of methyl ethyl ketone and to the solution is added an excess of ethanolic hydrochloric acid. The precipitated dihdyrochloride is filtered off under suction, washed with methyl ethyl ketone and recrystallised from ethanol/methyl ethyl ketone. By this means is obtained the 1-[2-[4-[3-(5H-dibenz[b,f]azepine - 5-yl)-2-methyl-propyl]-1-piperazinyl]-ethyl]-3-methyl-2-imidazolidinone dihdyrochloride, M.P. 223–224°; yield 8.9 g., 42% of the theoretical value.

The starting product, the 5-[2-methyl-3-(1-piperazinyl)-propyl]-5H-dibenz[b,f]azepine, is produced as follows:

(b) 57.0 g. (0.20 mol) of crude 5-(3-chloro-2-methylpropyl)-5H-dibenz[b,f]azepine (cp. Geigy A. G., Swiss Pat. No. 374,681) and 35.0 g. (0.22 mol) of 1-piperazinecarboxylic acid ethyl ester are heated with 35.0 g. (0.25 mol) of potassium carbonate and 1.0 g. (0.006 mol) of sodium iodide in 120 ml. of dimethylformamide for 16 hours to 95–100°. The solvent is then distilled off under water-jet vacuum. The residue is taken up in ethyl acetate, the ethyl acetate solution washed with water and extracted with 2 N hydrochloric acid. The acid aqueous extract is rendered alkaline with concentrated ammonia and the liberated base is extracted by shaking with ethyl acetate. The ethyl acetate solution is dried over sodium sulphate and concentrated by evaporation under a water-jet vacuum. The residue, is recrystallised from 95% ethanol; thus the pure 4-[3-(5H-dibenz[b,f]azepine-5-yl)-2-methyl-propyl]-piperazine-1-carboxylic acid ethyl ester is obtained, melting at 90–92.5°. This compound is refluxed with 32.0 g. (0.56 mol) of potassium hydroxide in 320 ml. of ethanol for 20 hours. The ethanol is afterwards distilled off under a water-jet vacuum and the residue taken up in ether. The ethereal solution is washed with a little water, dried over sodium sulphate and concentrated by evaporation under a water-jet vacuum. The residue, the crude base, is recrystallised from petroleum ether, whereupon the pure 5 - [2 - methyl - 3-(1 - piperazinyl)-propyl]-5H-dibenz[b,f]azepine melts at 77–79°; yield 24 g., 36% of the theoretical value.

The free base is converted with ethereal hydrochloric acid into the dihydrochloride, which, after recrystallisation from ethanol, melts at 168–169°.

Example 2

Analogously to Example 1(a) is obtained from 8.5 g. (0.05 mol) of 1-(3-chloropropyl)-3-methyl-2-imidazolidinone and 13.3 g. (0.040 mol) of 5-[2-methyl-3-(1-piperazinyl)-propyl]-5H-dibenz[b,f]azepine, the 1-[3-[4-[3-(5H-dibenz[b,f]azepin-5-yl) - 2 - methylpropyl]-1-piperazinyl]-propyl]-3-methyl-2-imidazolidinone, M.P. 132–135° (from ethyl acetate); M.P. of the dihydrochloride 235–237°; yield of free base 9.0 g., 47% of the theoretical value.

Example 3

(a) Analogously to Example 1(a) is obtained from 7.8 g. (0.048 mol) of 1-(2-chloroethyl)-3-methyl-2-imidazolidinone and 13.4 g. (0.040 mol) of 5-[2-methyl-3-(1-piperazinyl - propyl - 10,11 - dihydro - 5H - dibenz[b,f]abepine, the 1-[2-[4-[3-(10,11 - dihydro - 5H - dibenz[b,f]azepin-5-yl)-2-methyl - propyl]-1-piperazinyl]ethyl]-3-methyl-2-imidazolidinone, M.P. 58–63° (from ether/petroleum ether); M.P. of the dihydrochloride 231–234°; yield of dihydrochloride 16.9 g., 79% of the theoretical value.

The 5-[2-methyl-3-(1 - piperazinyl) - propyl] - 10,11-dihydro-5H-dibenz[b,f]azepine, used as starting product, is produced as follows:

(b) 68.5 g. (0.33 mol) of 10,11-dihydro-5H-dibenz[b,f]azepine are dissolved in 300 ml. of absolute toluene and to the solution is added under nitrogen, with the exclusion of moisture, a suspension of 14.0 g. (0.36 mol) of sodium amide in 40 ml. of absolute toluene. Whilst being stirred, the mixture is heated for one hour to 85°. To the reaction mixture are then added dropwise at 50°, within one hour, 71.0 g. (0.37 mol) of 1-(3-chloro-2-methyl-propyl)-4-methyl-piperazine and the mixture is refluxed for 20 hours. After cooling, the reaction mixture is concentrated by evaporation under a water-jet vacuum. The residue is taken up in ethyl acetate and the obtained solution washed with water. The organic phase is then extracted by shaking with 2 N hydrochloric acid. The combined acid aqueous extracts are rendered alkaline with concentrated ammonia and the liberated base repeatedly extracted by shaking with ethyl acetate. The combined ethyl acetate solutions are washed with water, dried over sodium sulphate and concentrated by evaporation under a water-jet vacuum. The residue is distilled under high vacuum. By this means is obtained the 5-[2-methyl-3-(4-methyl - 1 - piperazinyl) - propyl]-10,11-dihydro-5H-dibenz[b,f]azepine, B.P. 167–168°/0.005 torr; yield 100.6 g., 86.6% of the theoretical value.

(c) The base, obtained according to (b), is dissolved in 1000 ml. of absolute benzene. This solution is added dropwise at 25°, whilst stirring is performed, to a solution of 35 g. of cyanogen bromide in 280 ml. of abs. benzene. The reaction mixture is subsequently refluxed for 2 hours, cooled, filtered through a layer of active charcoal and then concentrated by evaporation under a water-jet vacuum. The residue, the crude 4-[3-(10,11-dihydro-5H-dibenz[b,f]azepin-5-yl) - 2 - methyl-propyl]-piperazine-1-carbonitrile, is refluxed in 1000 ml. of 2 N hydrochloric acid for 20 hours. After the reaction mixture has cooled, it is made alkaline with concentrated sodium hydroxide solution and the free base extracted with benzene. The benzene solution is dried over solid sodium hydroxide and concentrated by evaporation under a water-jet vacuum. The residue crystallises from acetonitrile. In this manner is obtained the 5-[2-methyl-3-(1-piperazinyl)-propyl]-10,11-dihydro - 5H - dibenz[b,f]azepine, M.P. 81–83°; yield 53 g., 44% of the theoretical value. The free base is converted with ethanolic hydrochloric acid into the dihydrochloride, M.P. 268–270° (from ethanol), with decomposition.

Example 4

Analogously to Example 1 (a) is obtained from 8.5 g. (0.05 mol) of 1-(3-chloropropyl)-3-methyl-2-imidazolidinone and 12.8 g. (0.038 mol) of 5-[2-methyl-3-(1-piperazinyl) - propyl]-10,11-dihydro-5H-dibenz[b,f]azepine, the 1-[3-[4-[3-(10,11-dihydro-5H-dibenz[b,f]azepin - 5 - yl) - 2-methyl-propyl]-1-piperazinyl]-propyl]-3-methyl-2-imidazolidinone dihydrochloride, M.P. 244–247°; yield 17.6 g., 80% of the theoretical value.

Example 5

(a) Analogously to Example 1 (a) is obtained from 9.2 g. (0.048 mol) of 1-(3-chloropropyl)-3-ethyl-2-imidazolidinone and 14.3 g. (0.042 mol) of 5-[2-methyl-3 - (1 - piperazinyl)-propyl]-10,11-dihydro - 5H-dibenz[b,f]azepine, the 1 - [3-[4-[3-(10,11-dihydro-5H-dibenz[b,f]azepin - 5 - yl) - 2-methyl-propyl]-1-piperazinyl]-propyl] - 3 - ethyl - 2-imidazolidinone dihydrochloride, M.P. 223–227°; yield 14.3 g., 64% of the theoretical value.

The 1 - ( 3 - chloropropyl)-3-ethyl-2-imidazolidinone, used as starting material, is produced as follows:

(b) 60.0 g. (0.52 mole) of ethyl-2-oxazolidinone and 68.1 g. (0.57 mole) of (3-chloropropyl)-isocyanate are mixed with 4.8 g. of lithium chloride and the mixture is heated for 90 minutes to 175–180°. The reaction mixture is then cooled and to it are added 300 ml. of chloroform. The chloroform solution is separated, washed three times with 30 ml. of saturated sodium chloride solution each time, dried over magnesium sulphate and concentrated by evaporation in vacuo. The residue is distilled under high vacuum to obtain the pure 1-(3-chloropropyl-3-ethyl-2-imidazolidinone, B.P. 105–110°/0.1 torr; $n_D^{24}$: 1,4889; yield 91.6 g., 92.5% of the theoretical value.

Example 6

16.0 g. (0.075 mol) of 1-[2-(1-piperazinyl)-ethyl]-3-methyl-2-imidazolidinone and 21.0 g. (0.074 mol) of crude 5 - (2 - methyl-3-chloropropyl)-5H-dibenz[b,f]azepine (cp. J. R. Geigy A.G., Swiss Pat. No. 374,681), 9.0 g. (0.064 mole) of potassium carbonate and 1.0 g. (0.006 mol) of sodium iodide in 120 ml. of methyl ethyl ketone are refluxed for 24 hours. After cooling, the obtained precipitate is filtered under suction, the filtrate concentrated by evaporation under a water-jet vacuum and the residue taken up in ethyl acetate. The obtained solution is washed with water and subsequently extracted with 2N hydrochloric acid. The combined acid aqueous extracts are made alkaline with concentrated ammonia. The liberated base is extracted by shaking with ethyl acetate, the ethyl acetate solution washed with water, dried over sodium sulphate and concentrated by evaporation under a water-jet vacuum. The residue, the crude base, is dissolved in methyl ethyl ketone and to the solution is added excess ethanolic hydrochloric acid. The precipitated dihydrochloride is filtered off under suction and washed with methyl ethyl ketone. In this manner is obtained the 1 - [2 - [4-[3,5H-dibenz[b,f]azepin-5-yl)-2-methyl - propyl] - 1 - piperazinyl] - ethyl]-3-methyl-2-imidazolidinone dihydrochloride, M.P. 223–224°; yield 3.6 g., 6.5% of the theoretical value.

Example 7

Analogously to Example 6 are obtained the following final products:

(a) From 16.0 g. (0.075 mol) of 1-[2-(1-piperazinyl)-ethyl] - 3 - methyl-2-imidazolidinone and 21.0 g. (0.074 mol) of 5 - (2-methyl-3-chloropropyl)-10,11-dihydro-5H-dibenz[b,f]azepine (cp. J. R. Geigy A. G, Belgian Pat. No. 594,436), the 1-[2-[4-[3-(10,11-dihydro-5H-dibenz[b,f]azepin - 5-yl-2-methyl-propyl]-1-piperazinyl]-ethyl]-3-methyl-2-imidazolidinone, M.P. 58–83°, which is converted into the dihydrochloride, M.P. 238–240°, and (b) From 18.0 g. (0.075 mol) of 1-[3-(1-piperazinyl)-propyl]-3-ethyl-2-imidazolidinone and 21.0 g. (0.074 mol) of 5 - (2 - methyl - 3 - chloropropyl)-10,11-dihydro-5H - dibenz[b,f]azepine, the 1-[3-[4-[3-(10,11-dihydro-5H - dibenz[b,f]azepin - 5-yl)-2-methyl-propyl]-1-piperazinyl] - propyl] - 3 - ethyl-2-imidazolidinone dihydrochloride, M.P. 223–227°.

Example 8

(a) 11.3 g. (0.03 mole) of 1-[2-[4-(2-methyl-3-chloropropyl) - 1 - piperazinyl] - ethyl] - 3-methyl-2-imidazolidinone-dihydrochloride are dissolved in 15 ml. of water. The solution is covered with a layer of toluene and, whilst cooling with ice is applied, 30 ml. of concentrated sodium hydroxide solution are added. The toluene solution, which contains the liberated base, is separated from the aqueous phase and dried over sodium hydroxide. This solution is then added dropwise at 75° to a suspension of 5H-dibenz[b,f]azepine-sodium, which has been produced from 1.36 g. (0.035 mol) of sodium amide in 2 ml. of absolute toluene and 5.8 g. (0.03 mol) of 5H-dibenz[b,f]azepine in 60 ml. of abs. toluene, according to Example 3 (b). The reaction mixture is refluxed for 16 hours, cooled and washed with water. The organic phase is separated and extracted with 2N hydrochloric acid. The free base is precipitated from the acid aqueous solution with concentrated ammonia and is then extracted with ethyl acetate. The ethyl acetate solution is dried over sodium sulphate and concentrated by evaporation in vacuo. The residue is crystallised from ether. The obtained yellow 1-[2-[4-[3-(5H-dibenz[b,f]azepin-5-yl)-2 - methylpropyl] - 1 - piperazinyl] - ethyl[-3-methyl-2-imidazolidinone melts at 107–109°. The free base is dissolved in methyl ethyl ketone and converted with abs.

ethanolic hydrochloric acid into the dihydrochloride, M.P. of the dihydrochloride 223–224°– yield of dihydrochloride 11.3 g., 70.8% of the theoretical value.

The 1 - [2 - [4 - (2-methyl-3-chloropropyl)-1-piperazinyl]-ethyl]-3-methyl-2-imidazolidinone, used as starting material, is produced as follows:

(b) 86 g. (0.5 mol) of β,4-dimethyl-piperazine-1-propanol are mixed with 100 ml. of absolute pyridine and, with the application of ice cooling, 61.5 g. (0.6 mol) of acetanhydride are added dropwise at 10–20°. The orange-coloured reaction mixture is allowed to stand for 16 hours at room temperature and afterwards concentrated by evaporation in vacuo. The residue is cooled with ice and concentrated ammonia is aded until the pH value of the obtained solution is 9. The precipitated free base is taken up in ethyl acetate, the solution dried with sodium sulphate and concentrated by evaporation in vacuo. The residue is distilled under high vacuum. The obtained 1 - (2-methyl-3-acetoxy-propyl)-4-methyl-piperazine boils at 66–69°/0.03 torr; yield 101.5 g., 94.8% of the theoretical value.

(c) 48.8 g. (0.46 mol) of cyanogen bromide are dissolved in 200 ml. of absolute benzene and to the solution are added dropwise, with ice-cooling and within 45 minutes, 90 g. (0.42 mol) of 1-(2-methyl-3-acetoxypropyl)-4-methyl-piperazine dissolved in 300 ml. of absolute benzene. The reaction mixture is then refluxed for 75 minutes, cooled, the obtained precipitate filtered off with suction and subsequently washed with benzene. The filtrate is concentrated by evaporation in vacuo, whereupon 81.5 g. of crude 4-(2-methyl-3-acetoxypropyl)-1-piperazinecarbonitrile are obtained.

91.0 g. of this crude product are refluxed with 600 ml. of 2 N hydrochloric acid for 18 hours. A solution is obtained which is concentrated by evaporation in vacuo. To the residue are slowly added, with ice-cooling and stirring, 300 ml. of concentrated potassium hydroxide solution. The upper phase, which contains the free base, is separated and is taken up in benzene. The benzene solution is dried with sodium hydroxide on a water-bath and is then concentrated by evaporation. The residue is distilled under high vacuum. The obtained β-methyl-piperazine-1-propanol boils at 74–78°/0.007 torr.

(d) 15.8 g. (0.1 mol) of the compound obtained according to (c) are refluxed for 17 hours in 100 ml. of diethyl ketone with 1.0 g. (0.006 mol) of sodium iodide, 7.0 g. (0.050 mol) of potassium carbonate and 16.3 g. (0.1 mol) of 1-(2-chloroethyl)-3-methyl-2-imidazolidinone. The obtained precipitate is filtered off under suction, washed with diethyl ketone and the filtrate concentrated by evaporation in vacuo. The residue is distilled under high vacuum. The obtained 1-[2-[4-(2-methyl-3-hydroxypropyl) - 1 - piperazinyl] - ethyl]-3-methyl-2-imidazolidinone boils at 173–180/0.008 torr; $n_D^{24}$: 1.5070; yield 26 g., 91.5% of the theoretical value.

(e) 14.0 g. (0.05 mol) of the compound, obtained according to (d), are dissolved in 40 ml. of chlorform and dry hydrochloric acid gas is passed through this solution until an acid reaction is indicated on congo paper. To the solution are then added dropwise 30 ml. (0.41 mol) of thionyl chloride and the reaction mixture is refluxed for 6 hours. The formed 1-[2-[4-(2-methyl-3-chloropropyl) - 1 - piperazinyl]-ethyl]-3-methyl-2-imidazolidinone dihydrochloride is filtered off under suction and afterwards washed with chloroform. The dihydrochloride melts at 251–254° with decomposition; yield 13.4 g., 71% of the theoretical value.

Example 9

Analogously to Example 8(a) is obtained, from 11.3 g. (0.03 mol) of the 1-[2-[4-(2-methyl-3-chloropropyl)-1-piperazinyl]ethyl]-3-methyl - 2 - imidazolidinone dihydrochloride, obtained according to Example 8(d) and which is converted into the free base, and 10,11-dihydro-5H-dibenz[b,f]azepin-sodium, which has been produced from 1.36 g. (0.035 mol) of sodium amide and 5.85 g. (0.030 mol) of 10,11-dihydro-5H-dibenz[b,f]azepine, and 1-[2-[4 - [3 - (10,11-dihydro-5H-dibenz[b,f]azepin- 5 - yl) - 2-methyl - propyl]-1-piperazinyl]-ethyl]-3-methyl-2-imidazolidinone, M.P. 58–63° (from ether/petroleum ether), M.P. of the dihydrochloride 231–234°; yield 7.3 g., 53% of the theoretical value.

Example 10

A dispersion of 1.15 g. (0.05 mol) of sodium in 1.15 g. of paraffin is added, under nitrogen and with stirring, to 14.2 g. (0.05 mol) of the 1-[2-[4-(2-methyl-3-hydroxypropyl)-1-piperazinyl]-ethyl] - 3 - methyl - 2 - imidazolidinone, prepared according to Example 8(d) and dissolved in 40 ml. of absolute benzene, and the mixture heated for 90 minutes to 70–75°. To the cooled reaction mixture is added dropwise at 0–5° a solution of 9.5 g. (0.05 mol) of p-toluenesulphonyl chloride in 40 ml. of absolute benzene. The reaction mixture is then stirred for 3 hours at room temperature and the precipitate is separated by filtration through Gelite® No. 545 (purified diatomaceous earth, trade name of the firm Johns Manville, International Corp.) and afterwards washed with benzene.

The benzene solution, which contains the 1-[2-[4-[2-methyl - 3 - (p-tolylsulphonyloxy)-propyl]-1-piperazinyl]-ethyl]-3-methyl-2-imidazolidinone, is subsequently added dropwise at 50° to a dispersion of 5H-dibenz[b,f]azepine-sodium in absolute toluene, which has been prepared from 2.11 g. (0.054 mol) of sodium amide in 4 ml. of absolute toluene and 9.7 g. (0.050 mol) of 5H-dibenz[b,f]azepine in 110 ml. of absolute toluene, according to Example 3(b). The reaction mixture is then refluxed for 16 hours, cooled and water is added. The organic phase is separated, extracted with 2 N hydrochloric acid, and the free base precipitated from the acid aqueous solution with concentrated ammonia. The free base is taken up in an ethyl acetate solution, the ethyl acetate solution dried over sodium sulphate and concentrated by evaporation in vacuo. The residue is crystallised from ether, whereupon is obtained the 1-[2-[4-[3-(5H-dibenz[b,f]azepin-5-yl) - 2 - methylpropyl]-1-piperazinyl] - ethyl]-3-methyl - 2 - imidazolidinone, M.P. 107–109°; yield 9.8 g., 39% of the theoretical value.

Example 11

(a) 5.0 g. (0.21 mol) of 1-[2[4-(3-hydroxy-2-methylpropyl) - 1 - piperazinyl]-ethyl]-3-methyl-2-imidazolidinone are dissolved in 50 ml. of absolute toluene and the solution is added under nitrogen, with the exclusion of moisture at a temperature of 0–10°, to a suspension of 8.2 g. (0.21 mol) of sodium amide in 150 ml. of absolute toluene. Whilst being stirred the mixture is heated for one hour to 85°. After cooling a solution of 40.0 g. (0.21 mol) of p-toluene-sulphonylchloride in 100 ml. of absolute toluene is dropped into the reaction mixture at a temperature of 0–5°, stirring is continued for an additional two hours at ambient temperature and the precipitated sodium chloride is removed by filtration. The filtrate obtained represents a solution of 1-[2-[4-[3-(p-tolylsulphonyloxy) - 2 - methyl-propyl]-1-piperazinyl]-ethyl]-3-methyl-2-imidazolidinone.

(b) 40.6 g. (0.2 mol) of 10,11-dihydro-5H-dibenz [b,f] azepine are dissolved in 200 ml. of absolute toluene at 80°. To this solution a suspension of 8.2 g. (0.21 mol) of sodium amide in 30 ml. of absolute toluene is added under nitrogen, with the exclusion of moisture. Whilst being stirred, the mixture is heated to 85° for one hour. A suspension of the sodium salt of 10,11-dihydro-5H-dibenz-[b,f]azepine is obtained.

(c) The solution prepared according to (a) is added to the suspension prepared according to (b) and the mixture is refluxed for 24 hours. After cooling, the reaction mixture is concentrated by evaporation under a water-jet vacuum. The residue is taken up in ethyl acetate and the ethyl acetate solution is extracted with 2 N hydrochloric acid. The combined aqueous acid extracts are rendered alkaline with concentrated ammonia and the liberated base repeatedly extracted by shaking with ethyl acetate. The combined ethylacetate solutions are washed with water, dried over sodium sulphate and evaporated under a water-jet stream. The residue is dissolved in methyl ethyl ketone and the dissolved free base is converted with ethanolic hydrochloric acid into the 1-[2-[4-[3-(10,11-dihydro - 5H - dibenzo[b,f]azepin - 5 - yl) - 2 - methyl-propyl] - 1 - piperazinyl] - ethyl] - 3 - methyl - 2 - imidazolidinone-dihydro-chloride, M.P. 210–216°.

Example 12

(a) 3.33 g. (0.01 mol) of 5 - [2 - methyl - 3 - (1-piperazinyl)-propyl]-5H-dibenz[b,f]azepine and 2.8 g. (0.014 mol) of crude 1-methyl-3,3-bis-(2-chloroethyl)-urea are dissolved in 40 ml. of diethyl ketone. 3.6 g. (0.026 mol) of potassium carbonate are added and the mixture is refluxed for twelve hours in the course of which an additional amount of 2.4 g. (0.018 mol) of potassium carbonate are added after each four and eight hours.

After cooling the reaction mixture is filtered over Celite® and the solid residue is extracted three times by boiling with acetone. The combined filtered solutions are evaporated under a water-jet vacuum and the oily residue is dissolved in 50 ml. of benzene. The benzene solution is extracted with 20 ml. of 2 N hydrochloric acid followed by washing with water. The combined aqueous acid extracts are rendered alkaline with 2 N sodium hydroxide and extracted with benzene.

The benzene solution is washed with water, dried over magnesium sulphate and evaporated to dryness.

The residue is chromatographed on a Kieselgel-column Meck® (grain size 0.02–0.2 mm.), which has been impregnated with 0.5 N sodium hydroxide using chloroform as elution agent.

The fractions which contain the crude reaction product are combined and concentrated, whereupon a crystalline residue is obtained. This is dissolved in methylethyl ketone and an excess of ethereal hydrochloric acid is added, whereupon the dihydrochloride precipitates and is filtered by suction and recrystallised from ethanol/ethyl acetate.

There the pure 1-[2-[4-[3-(5H-dibenz[b,f]azepin-5-yl)-2-methyl-propyl] - 1 - piperazinyl]-ethyl]-3-methyl-2-imidazolidinone dihydrochloride ise obtained, M.P. 223–224°.

Analogously are obtained the following products using the same amount of crude 1-methyl-3,3-bis-(2-chloroethyl)-urea as starting material:

From 3.35 g. (0.01 mol) of 5-[2-methyl-3-(1-piperazinyl)-propyl]-10,11-dihydro-5H-dibenz[b,f]azepine the 1-[2-[4-[3-(10,11-dihydro - 5H - dibenz[b,f]azepin-5-yl)-2-methyl-propyl] - 1 - piperazinyl]-ethyl] - 3 - methyl-2-imidazolidinone dihydrochloride M.P. 231–234° (from methylethyl ketone).

From 3.70 g. (0.01 mol) of 3-chloro-5-[2-methyl-3-(1-piperazinyl)-propyl] - 10,11 - dihydro - 5H - dibenz[b,f] azepine, the 1-[2-[4-[3-(3-chloro - 10,11 - dihydro-5H-dibenz[b,f]azepin - 5 - yl) - 2 - methyl-propyl]-1-piperazinyl]-ethyl] - 3 - methyl - 2 - imidazolidinone dihydrochloride, M.P. 268–272° (from ethanol).

The 1-methyl-3,3-bis-(2-chloroethyl)-urea used as starting material is prepared as follows:

(b) 105.1 g. (10 mol) of freshly distilled diethanolamine are dissolved in 1000 ml. of absolute methylenechloride. To this solution a solution of 59.0 g. (1.03 mol of methylisocyanate in 200 ml. of absolute methylene chloride is added. The mixture is refluxed for 150 minutes, cooled to 0° and a solution of 250 g. (2.1 mol) of thionylchloride in 250 ml. of absolute methylenechloride is added to the solution of 1-methyl-3,3-bis-(2-hydroxyethyl)-urea during one hour. The reaction mixture is refluxed for four hours, followed by evaporation under a vacuum, whereupon the crude 1-methyl-3,3-bis-(2-chloroethyl-urea is obtained, which is dried during 8 hours at a temperature of 70–80° under a high vacuum.

Example 13

(a) A mixture of 3.18 g. (0.01 mol) of 3-chloro-5-(3 - chloro - 2 - methyl-propyl) - 5H - dibenz[b,]azepine, 2.12 g. (0.01 mol) of 1-[2-(1-piperazinyl)-ethyl]-3-methyl-2-imidazolidinone, 20 ml. of dimethyl ketone and 2.76 g. (0.02 mol) of potassium carbonate is refluxed for 45 hours. Then the diethyl ketone is removed under vacuum and replaced by 30 ml. of dimethyl formamide. Reflux of the mixture is continued during eight hours followed by the evaporation of dimethyl formamide in vacuo. The residue is thoroughly shaken with an ether/water mixture; the ether-layer is extracted with 2 N hydrochloric acid. The aqueous acid extract is rendered alkaline with ammonia. The liberated base is extracted into ethyl acetate, the ethyl acetate solution dried over sodium sulphate and concentrated by evaporation in vacuo, whereupon 2.0 g. of a noncrystallising residue are obtained, which is dissolved in methyl ethyl ketone and then combined with a solution of 0.95 g. maleic acid in methyl ethyl ketone. The precipitated salt is filtered by suction and dried. In this manner, the 1-[2-[4-[3-(3-chloro-5H-dibenz[b,f] azepin-5-yl)-2-methyl-propyl] - 1 - piperazinyl]-ethyl]-3-methyl-2-imidazolidinone maleate is obtained, M.P. 165–168°; yield 35% of the theoretical value.

The 3-chloro-5-(3-chloro-2-methyl-propyl)-5H-dibenz-[b,f]azepine used as starting material is prepared in an analogous manner as described in Swiss Pat. No. 374,681 by reacting 23.0 g. (0.1 mol) of 3-chloro-5H-dibenz[b,f] azepine, 0.11 mol of a suspension of sodium amide in toluene and 22.0 g. (0.127 mol) of 1-chloro-2-methyl-3-bromopropane. The product in crude state is immediately used for the described reaction. Yield 40% of the theoretical value.

Example 14

Analogously to Example 3(b) is obtained by reacting 92.0 g. (0.4 mol) of 3-chloro-10,11-dihydro-5H-dibenz-[b,f]azepine dissolved in 400 ml. of absolute toluene and 0.41 mol of a suspension of sodium amide in toluene at 90° during one hour followed by reaction with 76.0 g. (0.399 mol) of 1-(3-chloro-2-methyl-propyl)-4-methyl-piperazine by reflux during 24 hours, the 5-[2-methyl-3-(4-methyl-1-piperazinyl)-propyl]-3-chloro - 10,11 - dihydro-5H-dibenz[b,f]azepine as an oily product in quantitative yield.

Analogously to Example 3(c) a solution og 134.0 g. (0.35 mol) of the obtained oily base in 1300 ml. of absolute benzene is dropped into a solution of 42.3 g. (15% excess) of cyanogen bromide in 250 ml. of absolute benzene, refluxed during 1¼ hours, filtered off from solid particles and purified with charcoal. The clear filtrate is washed with water and evaporated to dryness, whereupon 173.0 g. of an orange coloured resin are obtained, which is recrystalized from 150 ml. of acetonitrile, yielding the 4-[3-(3-chloro - 10,11 - dihydro - 5H - dibenz[b,f]azepin-5-yl)-2-methylpropyl]-piperazine - 1 - carbonitrile in yellow crystals. M.P. 128.5–132°; yield 107.0 g., 77.6% of the theoretical value.

By saponification of 20.0 g. of the nitrile obtained with 200 ml. of 2 N hydrochloric acid during 20 hours the 5-[2-methyl-3-(1-piperazinyl)-propyl]-(3-chloro) - 10,11-dihydro-5H-dibenz[b,f]azepine is obtained as a yellowish oily product. Yield 18.8 g. (quantitative).

Analogously to Example 1(a), 18.0 g. (0.0486 mol) of the base obtained are reacted with 7.95 g. (0.0480 mol) of 1-(2-chloroethyl)-3-methyl-2-imidazolidinone, 9.0 g. of potassium carbonate and 0.5 g. of sodium iodide in 100 ml. of diethyl ketone.

After working up the reaction mixture, the 1-[2-[4-[3-(3-chloro-10,11-dihydro-5H-dibenz[b,f]azepin-5 - yl) - 2- methyl-propyl]-1-piperazinyl]-ethyl]-3-methyl - 2 - imidazolidinone is obtained as an orange coloured oily product which slowly crystallises. M.P. 136.5–140°; yield 23.5 g.; 97.7% of the theoretical value.

The dihydrochloride of the base sinters at 258°, begins to melt at 268° and is completely liquidified at 272° under decomposition.

Example 15

Analogously to Example 8(a) g. (0.1 mol) of 1-[2-[4-(2-methyl-3-chloro-propyl)-1 - piperazinyl] - ethyl] - 3-methyl-2-imidazolidinone-dihydrochloride are converted into the free base dissolved in toluene. This solution is then reacted with 3-chloro-10,11-dihydro-5H - dibenz[b,f]azepine-sodium, which has been prepared from 23.0 g. (0.1 mol) of 3-chloro-10,11-dihydro-5H - dibenz[b,f]azepine dissolved in 150 ml. of absolute toluene and a suspension of 0.11 mol of sodium amide in toluene, yielding 23.0 g. of the crude 1-[2-[4-[3-(3-chloro-10,11-dihydro-5H - dibenz[b,f]azepin-5-yl)-2-methyl-propyl] - 1 - piperazinyl]-ethyl]-3-methyl-2-imidazolidinone. This is converted with oxalic acid dissolved in methyl ethyl ketone into the well crystallising oxalate-additional salt, from which the free base is obtained by reaction with 2 N sodium hydroxide solution. The maleate thereof is prepared with maleic acid in methyl ethyl ketone. M.P. of the maleic acid addition salt, 149–151°.

What is claimed is:

1. A pharmaceutical composition comprising an effective amount for controlling psychosomatic disturbances of a compound of the formula

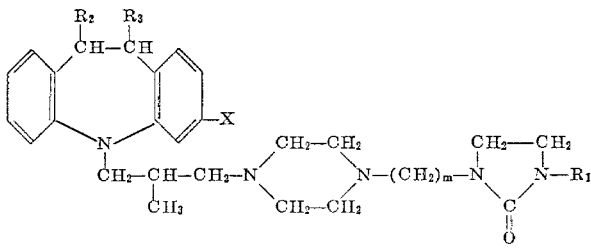

wherein

X is hydrogen or chloro, $m$ is 2 or 3, $R_1$ is methyl or ethyl, and each of $R_2$ and $R_3$ is hydrogen or, together, they form an additional bond, and a pharmaceutically acceptable acid addition salt thereof and a pharmacetuically acceptable carrier.

2. The method of treating psychosomatic disturbances in a warm-blooded animal which comprises administering to said animal an effective amount of a compound according to claim 1.

3. A composition as claimed in claim 1, in which compound is the 1-[2-[4-[3-(5H-dibenz[b,f]azepin-5-yl)-2-methyl-propyl]-1-piperazinyl]-ethyl]-3-methyl - 2 - imidazolidinone.

4. A composition as claimed in claim 1, in which com pound is the 1-[3-[4-[3-(5H-dibenz[b,f]azepin-5-yl)-2-methyl-propyl]-1-piperazinyl]-propyl]-3-methyl-2 - imidazolidinone.

5. A composition as claimed in claim 1, in which compound is the 1-[2-[4-[3-(10,11-dihydro-5H - dibenz[b,f]azepin-5-yl)-2-methyl-propyl]-1-piperazinyl] - ethyl] - 3-methyl-2-imidazolidinone.

6. A composition as claimed in claim 1, in which compounds is the 1-[3-[4-[3-(10,11-dihydro-5H-dibenz[b,f]azepin-5-yl)-2-methyl-propyl]-1-piperazinyl]-propyl] - 3-methyl-2-imidazolidinone.

7. A composition as claimed in claim 1, in which compound is 1-[3-[4-[3-(10,11-dihydro-5H-dibenz[b,f]azepin-5-yl)-2-methyl-propyl]-1-piperazinyl]-propyl]-3-ethyl - 2-imidazolidinone.

8. A composition as claimed in claim 1, in which compound is the 1-[2-[4-[3-(3-chloro-10,11-dihydro-5H-dibenz[b,f]azepin-5-yl)-2-methyl-propyl]-1 - piperazinyl]-ethyl-3-methyl-2-imidazolidinone.

9. A composition as claimed in claim 1, in which compound is the 1-[2-[4-[3-(3-chloro-5H-dibenz[b,f]azepin-5-yl)-2-methyl-propyl]-1-piperazinyl]-ethyl]-3-methyl - 2-imidazolidinone.

References Cited
UNITED STATES PATENTS

| | | | |
|---|---|---|---|
| 2,981,736 | 4/1961 | Gaillot | 260—268 |
| 3,074,931 | 1/1963 | Craig | 260—268 |
| 3,133,068 | 5/1964 | Scheidler et al. | 260—268 |
| 3,196,152 | 7/1965 | Wright et al. | 260—268 |
| 3,324,113 | 7/1967 | Scheidler et al. | 260—268 |
| 3,374,237 | 3/1968 | Wright et al. | 260—268 |
| 3,454,598 | 7/1969 | Yale et al. | 260—268 |
| 3,458,499 | 7/1969 | Scheidler et al. | 260—269 |
| 3,541,210 | 12/1970 | Robertson et al. | 260—268 |
| 3,302,247 | 5/1967 | Arnold et al. | 260—243 |
| 3,669,107 | 10/1972 | Scheidler et al. | 260—268 TR |

STANLEY J. FRIEDMAN, Primary Examiner